United States Patent
Edwards

(10) Patent No.: US 7,086,688 B2
(45) Date of Patent: Aug. 8, 2006

(54) FASTENING SYSTEM WITH BEARING MEMBER

(75) Inventor: David Michael Edwards, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 76 days.

(21) Appl. No.: 10/663,270

(22) Filed: Sep. 16, 2003

(65) Prior Publication Data

US 2005/0057075 A1    Mar. 17, 2005

(51) Int. Cl.
*B62D 27/02* (2006.01)

(52) U.S. Cl. ............... 296/181.3; 296/35.1; 296/183.1

(58) Field of Classification Search ............... 296/35.1, 296/183.1, 204, 181.2, 901.01, 191, 181.3; 411/546
See application file for complete search history.

(56) References Cited

U.S. PATENT DOCUMENTS

| | | | |
|---|---|---|---|
| 1,406,240 A | 2/1922 | Sturt | |
| 1,552,702 A | 9/1925 | Irish | |
| 1,723,621 A | 8/1929 | Jewell | |
| 2,275,315 A * | 3/1942 | Ray | 411/371.2 |
| 2,302,501 A | 11/1942 | Mears | |
| 2,446,323 A | 8/1948 | Davis et al. | |
| 2,485,794 A | 10/1949 | Waterbury et al. | |
| 2,769,656 A | 11/1956 | Lee | |
| 2,838,339 A | 6/1958 | Schaldenbrand | |
| 2,882,090 A | 4/1959 | Sewelin | |
| 2,883,232 A | 4/1959 | Olley et al. | |
| 3,960,048 A | 6/1976 | Wagner | |
| 4,067,168 A | 1/1978 | Thurner | |
| 4,128,271 A | 12/1978 | Gray | |
| 4,162,098 A * | 7/1979 | Richardson, III | 296/39.2 |
| 4,193,434 A | 3/1980 | Wagner | |
| 4,238,165 A * | 12/1980 | Wagner | 403/408.1 |
| 4,435,112 A * | 3/1984 | Becker | 411/368 |
| 4,437,784 A | 3/1984 | Peterson | |
| 4,472,861 A | 9/1984 | Joseph et al. | |
| 4,521,049 A * | 6/1985 | Genma et al. | 296/181.2 |
| 4,540,214 A | 9/1985 | Wagner | |
| 4,572,568 A | 2/1986 | Kapp et al. | |
| 4,595,229 A | 6/1986 | Wagner | |
| 4,659,133 A | 4/1987 | Gower | |
| 4,729,606 A | 3/1988 | Narita et al. | |
| 4,732,519 A | 3/1988 | Wagner | |
| 4,740,026 A | 4/1988 | Wagner | |
| 4,768,822 A | 9/1988 | Gower | |
| 4,792,475 A | 12/1988 | Bien | |
| 4,850,633 A | 7/1989 | Emery | |
| 4,850,732 A | 7/1989 | Swanson | |
| 4,867,461 A * | 9/1989 | Shimmell | 277/593 |

(Continued)

FOREIGN PATENT DOCUMENTS

FR    2796674    *   1/2001

*Primary Examiner*—Dennis H. Pedder
(74) *Attorney, Agent, or Firm*—Dinsmore & Shohl LLP

(57) ABSTRACT

Exemplary embodiments of a fastening system include an object with a securement structure and a mounting structure fastened with respect to the securement structure. The fastening system further includes a bearing member with a first portion for bearing against the bearing surface of the securement structure and a second portion for bearing against the bearing surface of the mounting structure. The bearing member may be biased such that the bearing surfaces of the securement and mounting structures both simultaneously receive compressive force from the respective first and second portions of the bearing member.

18 Claims, 8 Drawing Sheets

U.S. PATENT DOCUMENTS

| | | |
|---|---|---|
| 4,934,888 A | 6/1990 | Corsmeier et al. |
| 4,986,590 A | 1/1991 | Patti et al. |
| 5,040,917 A | 8/1991 | Camuffo |
| 5,106,225 A | 4/1992 | Andre et al. |
| 5,139,361 A | 8/1992 | Camuffo |
| 5,150,940 A | 9/1992 | Kennedy |
| 5,244,325 A * | 9/1993 | Knohl .................. 411/353 |
| 5,249,834 A * | 10/1993 | Johnson et al. ............ 296/35.1 |
| 5,267,820 A | 12/1993 | Sturtevant |
| 5,308,133 A | 5/1994 | Mangum et al. |
| 5,345,658 A | 9/1994 | Kennedy |
| 5,513,934 A | 5/1996 | German |
| 5,553,906 A | 9/1996 | Kunz |
| 5,730,486 A | 3/1998 | Jurica |
| 5,899,519 A * | 5/1999 | Doshi ..................... 296/39.2 |
| 6,059,503 A | 5/2000 | Johnson |
| 6,203,090 B1 | 3/2001 | Vitoorapakorn |
| 6,238,127 B1 | 5/2001 | Jhumra et al. |
| 6,280,132 B1 | 8/2001 | Szczukowski et al. |
| 6,361,096 B1 | 3/2002 | Kim |
| 6,394,537 B1 | 5/2002 | DeRees |
| 6,702,365 B1 * | 3/2004 | Semple et al. .............. 296/204 |
| 6,883,859 B1 | 4/2005 | Edwards et al. |

* cited by examiner

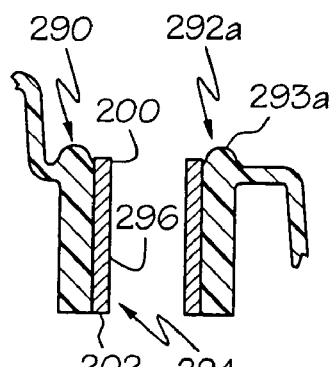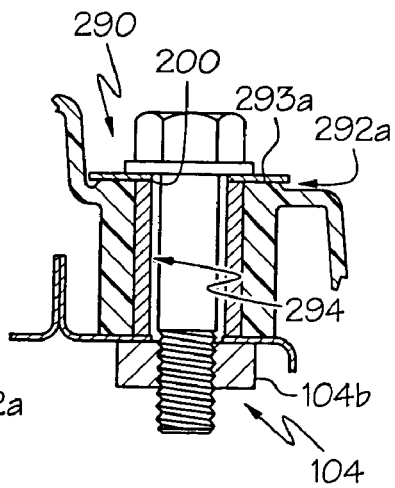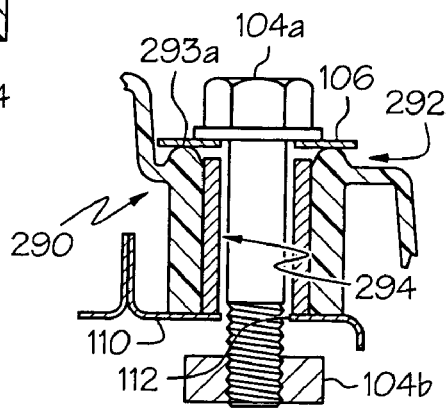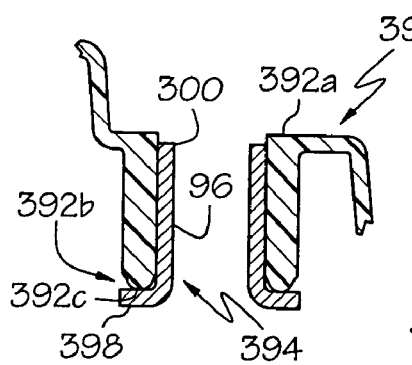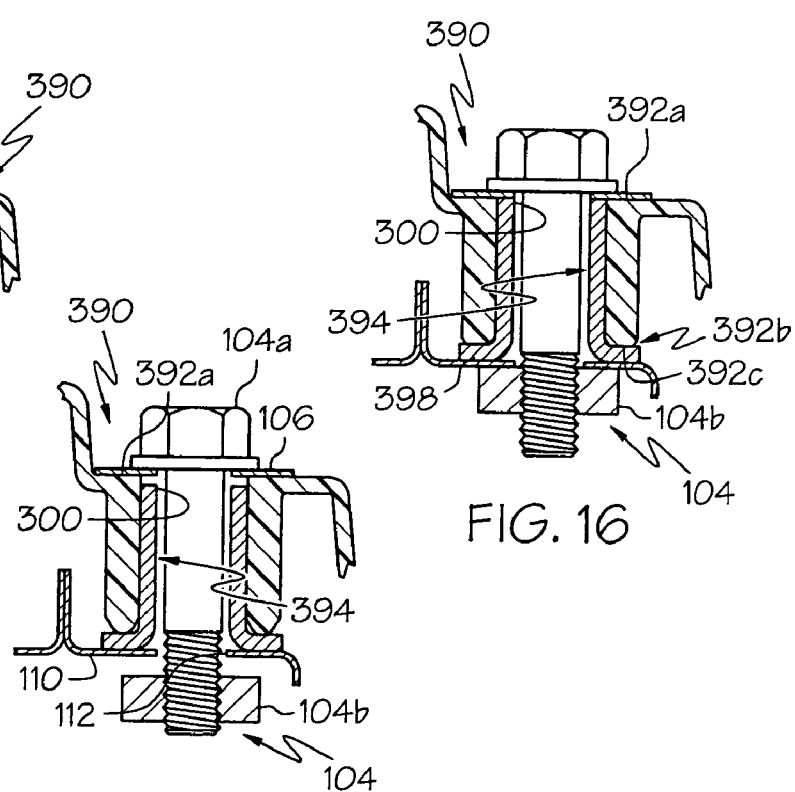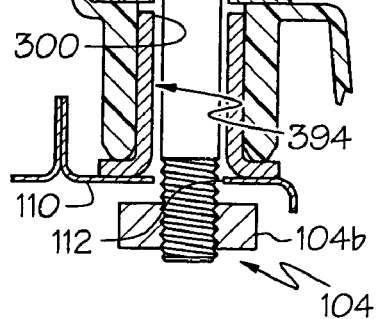

FASTENING SYSTEM WITH BEARING MEMBER

TECHNICAL FIELD

The present invention relates to a fastening system and more particularly to a fastening system for a vehicle.

BACKGROUND OF THE INVENTION

Pickup vehicles are commonly used to facilitate transportation of cargo items from one location to another. While pickup vehicles are available in many sizes and configurations, a typical pickup vehicle includes a vehicle bed having a cargo carrying floor that can support cargo, such as lumber, rocks, groceries and/or other items. Because a conventional vehicle bed is exposed to harsh conditions, conventional vehicle beds are typically provided with a vehicle bed liner for attaching to the vehicle bed. The vehicle bed liner helps prevent damage to the vehicle bed that might otherwise occur from environmental elements and/or cargo being hauled in the vehicle bed. Conventional vehicle bed liners may be fastened or retained to the vehicle bed with conventional fastening arrangements. Not only is there a need for fastening systems for attaching liners, but there is a broader need for fastening systems to attach a vehicle bed floor at a fastening location of the vehicle. Still further, there is a need for fastening systems that can have a wide variety of applications including but not limited to the vehicular industry.

SUMMARY OF THE INVENTION

Accordingly, it is an aspect of the present invention to provide an improved fastening system to enhance the fastening characteristics between an object (e.g., a vehicle bed floor) and a support structure (e.g., a support structure of a vehicle).

To achieve the foregoing and other aspects, and in accordance with the purposes of the present invention defined herein, at a fastening system is provided with an object including a securement structure for mounting at a fastening location with a fastener. The securement structure includes a bearing surface. The fastening system further includes a mounting structure fastened with respect to the securement structure that includes a lower creep rate than a creep rate of the securement structure. The mounting structure further includes a bearing surface. The fastening system still further includes a bearing member with a first portion for bearing against the bearing surface of the securement structure and a second portion for bearing against the bearing surface of the mounting structure. The bearing member may be biased such that the bearing surfaces of the securement and mounting structures both simultaneously receive compressive force from the respective first and second portions of the bearing member.

To achieve further and other aspects, and in accordance with the purposes of the present invention defined herein, a vehicle bed element is provided for mounting at a fastening location of a vehicle with a fastener. The vehicle bed element comprises a securement structure including an aperture having a diameter and a bearing surface circumscribing the aperture. The vehicle bed element further comprises a mounting structure fastened with respect to the securement structure. The mounting structure includes a lower creep rate than a creep rate of the securement structure. The mounting structure includes an aperture that has a smaller diameter than the diameter of the securement structure aperture and a bearing surface circumscribing the mounting structure aperture. The vehicle bed still further includes a bearing member with a first portion with a first surface for bearing against the bearing surface of the securement structure. The first portion includes a diameter that is larger than the diameter of the securement structure aperture. The bearing member further includes a second portion with a second surface that is offset from the first surface for bearing against the bearing surface of the mounting structure. The second portion includes a diameter that is smaller than the diameter of the securement structure aperture and larger than the diameter of the mounting structure aperture. The bearing member may be biased such that the bearing surfaces of the securement and mounting structures both simultaneously receive compressive force from the respective first and second surfaces of the bearing member.

Additional aspects of the invention will be set forth in part in the description that follows, and in part will become apparent to those skilled in the art upon examination of the following or may be learned with the practice of the invention. The aspects of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 11 illustrates a partial cross-sectional view of a fastening section in accordance with still another exemplary embodiment of the present invention;

FIG. 12 illustrates the exemplary embodiment of the fastening section of FIG. 11 just prior to compression of an extension element with a fastener;

FIG. 13 illustrates the exemplary embodiment of the fastening section of FIG. 11 after compression of the extension element with the fastener;

FIG. 14 illustrates a partial cross-sectional view of a fastening section in accordance with still another exemplary embodiment of the present invention;

FIG. 15 illustrates the exemplary embodiment of the fastening section of FIG. 14 just prior to compression of an extension element with a fastener;

FIG. 16 illustrates the exemplary embodiment of the fastening section of FIG. 14 after compression of the extension element with the fastener;

DETAILED DESCRIPTION OF EXEMPLARY EMBODIMENTS

Although the fastening systems of the present invention are not limited to vehicular applications, the concepts of the present invention will be discussed in detail with respect to mounting a vehicle bed floor at a fastening location of a vehicle as shown in FIGS. 1–18E, wherein like numbers indicate the same or corresponding elements throughout the views.

Figure 1:
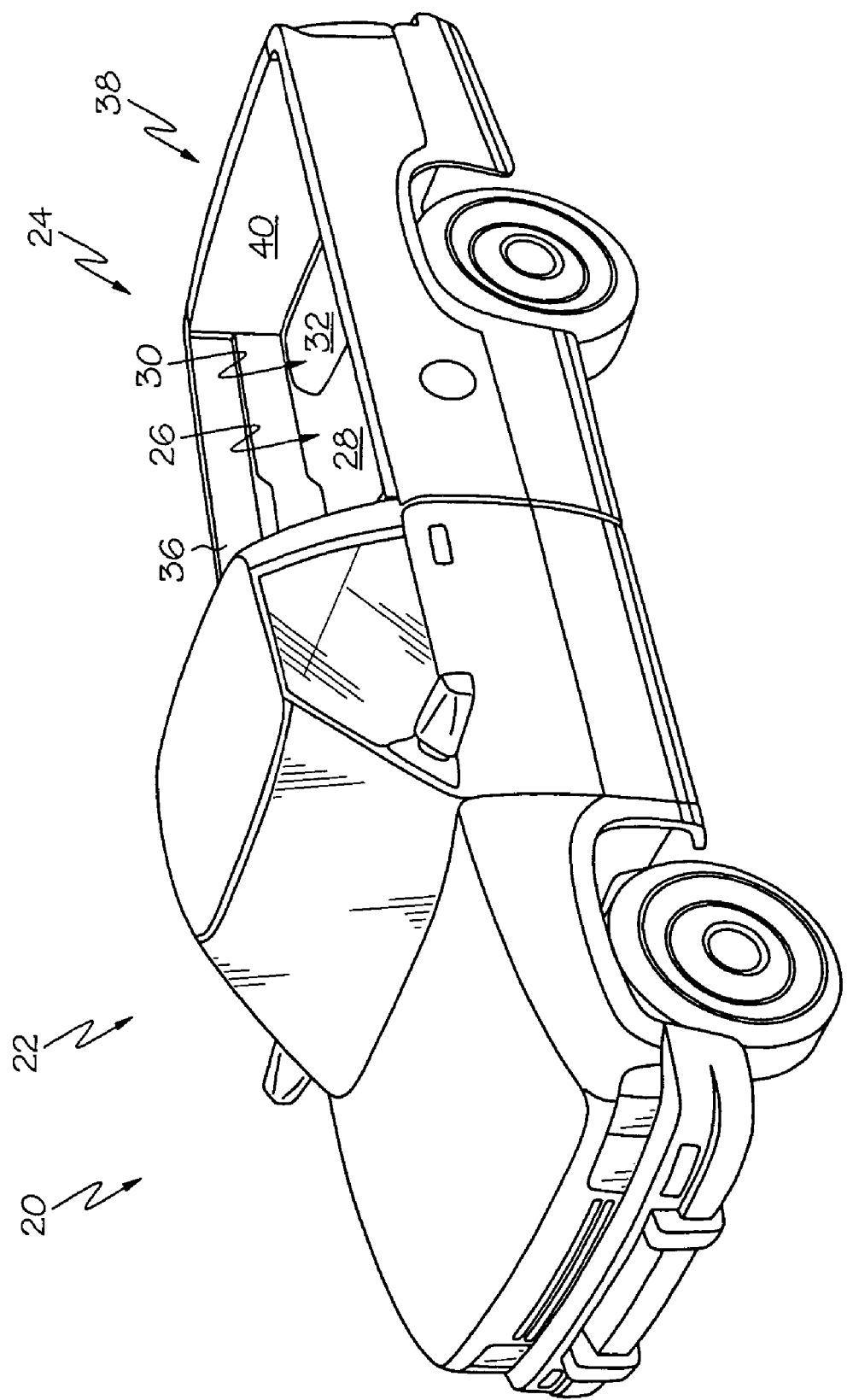
FIG. 1 is a front perspective view of a pickup vehicle having a vehicle bed floor in accordance with one exemplary embodiment of the present invention wherein certain contours of the vehicle bed floor and closure member being removed for clarity.
Figure 2:
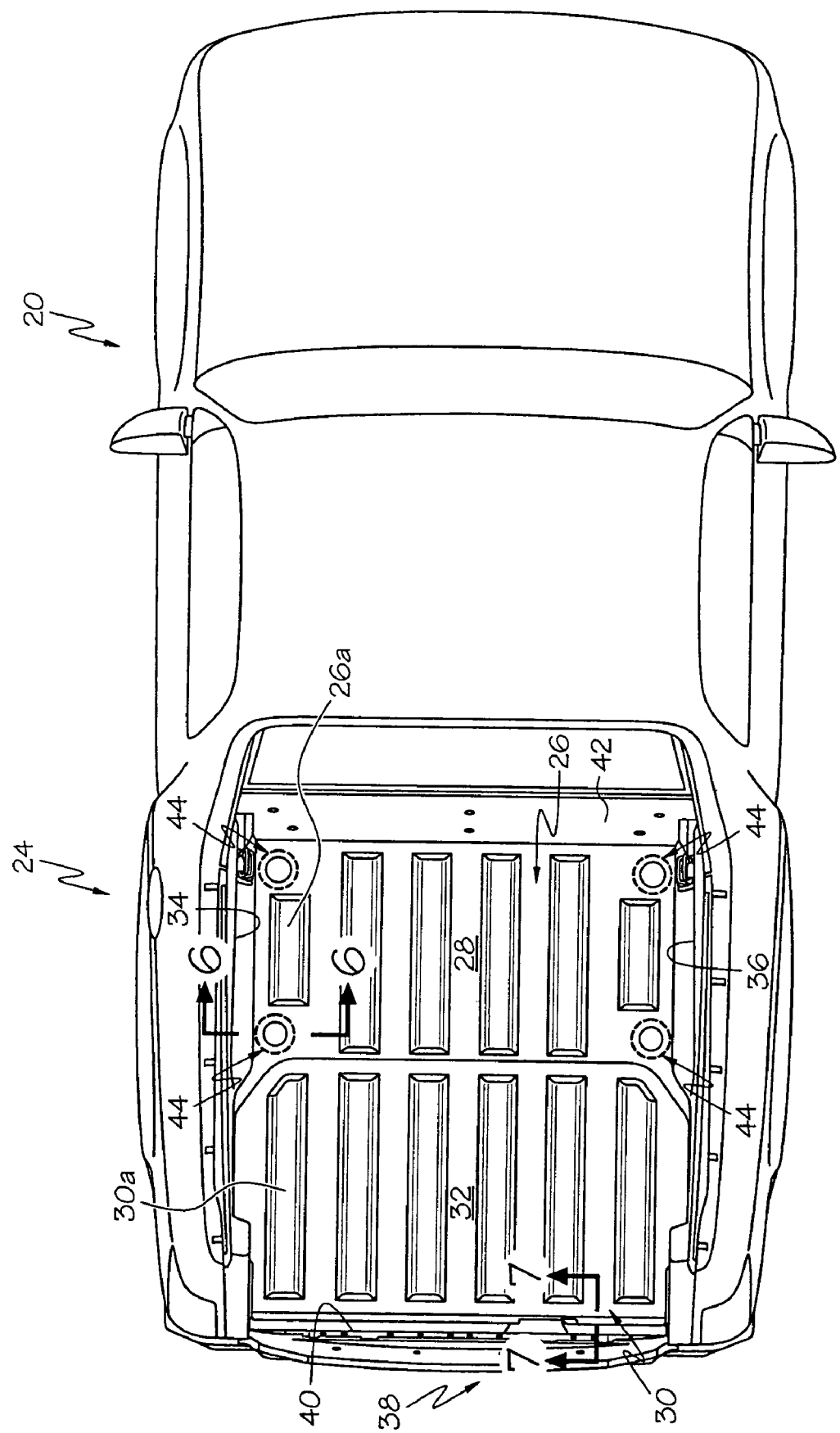
FIG. 2 is a top plan view generally depicting the pickup vehicle of FIG. 1.
Figure 3:
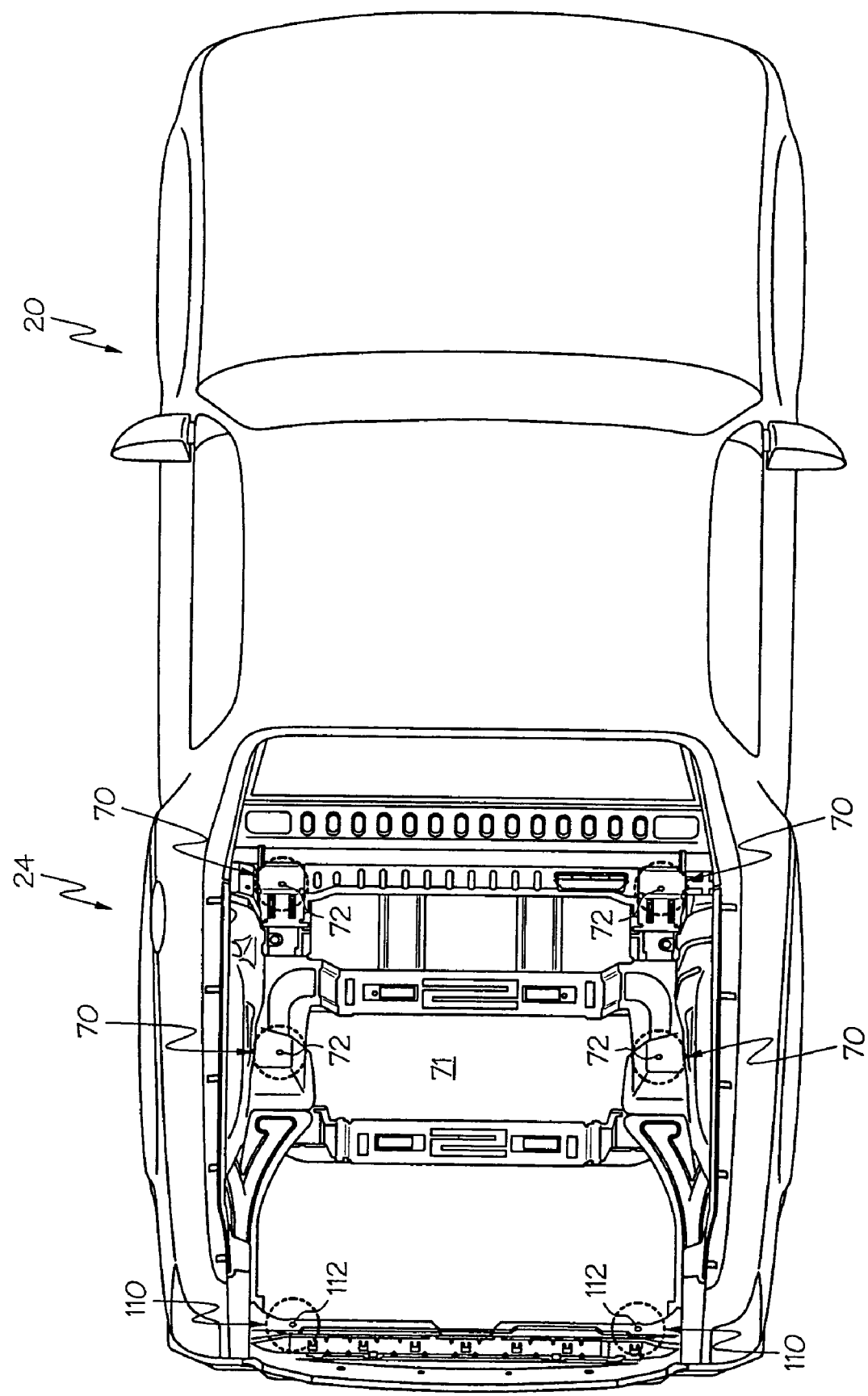
FIG. 3 is a top plan view depicting the pickup vehicle of FIG. 2 with certain components removed to expose an exemplary underlying support structure.
Figure 4:
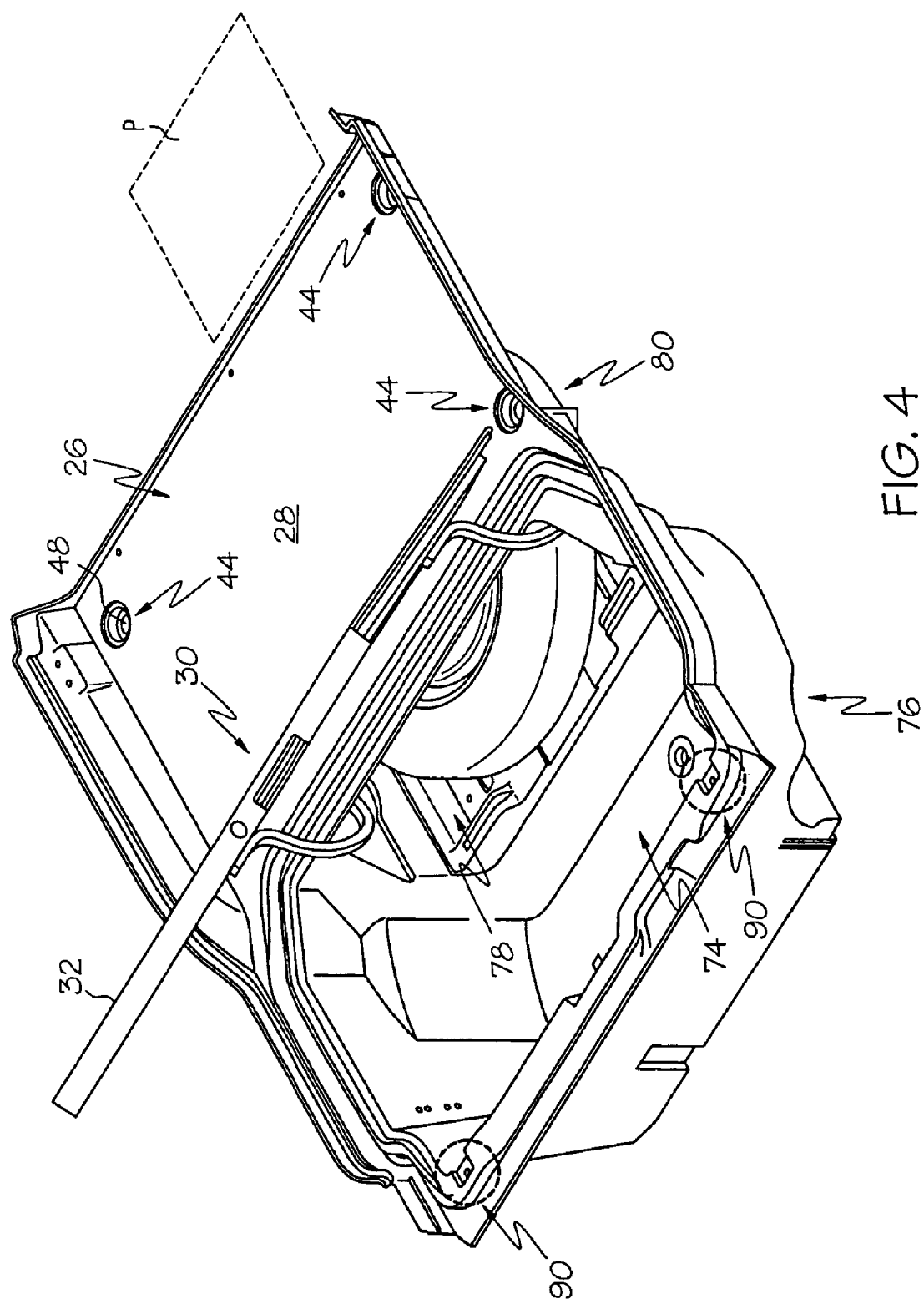
FIG. 4 is a top rear perspective view depicting selected components of the vehicle bed floor of FIG. 2 with the closure member in the opened position wherein certain contours of the vehicle bed floor and closure member being removed for clarity.

One exemplary vehicle 20 that incorporates the fastening system is best illustrated in FIGS. 1–3. The exemplary vehicle 20 includes a cab portion 22 and a vehicle bed portion 24 that is configured to hold cargo. The vehicle bed portion 24 can further include one or more inner bed elements that substantially define the primary cargo carrying compartment of the pickup vehicle bed. As shown in FIG. 2, for example, the vehicle bed portion 24 can include a tailgate element 40, a headboard element 42, a left side element 34, a right side element 36, a closure member 30 for covering an access opening, and a vehicle bed floor 26. The bed floor 26 can include a first support surface 28, and the closure member 30 can include a second support surface 32. As shown FIG. 2, the first support surface 28 and the second support surface 32 can substantially provide the cargo carrying floor of the vehicle bed portion 24, and can accordingly directly support cargo. Both the vehicle bed floor 26 and the closure member 30 are shown in FIG. 2 to include raised contours 26a and 30a. Although such contours can provide rigidity and/or texture to a cargo-carrying floor, it should be understood that an exemplary vehicle bed floor and/or closure member might not include any such contours (e.g., as shown in FIGS. 1 and 4). Although not specifically depicted herein, exemplary embodiments of the present invention may be used to mount elements of a truck bed without access openings or closure members.

Elements of the vehicle bed portion 24 can be formed from any number of materials, as for example, steel, aluminum, plastic, fiberglass, composites, and/or a combination thereof. In one exemplary embodiment, the inner bed elements can include a plurality of plastic panels. For example, each of the vehicle bed floor 26, the left side element 34, the right side element 36, the headboard element 42, the tailgate element 40 and the closure member 30 can comprise a separate SMC (Sheet Molded Compound) plastic panel.

Figure 5:
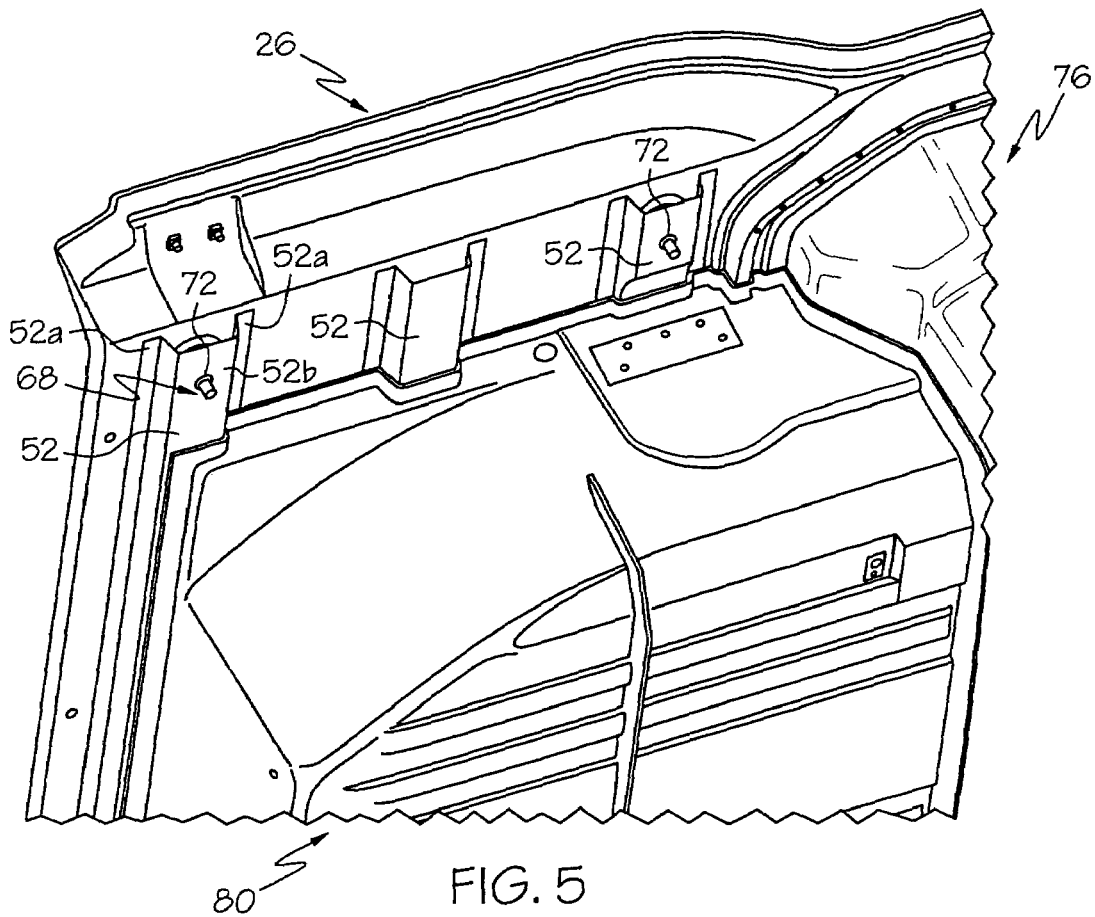
FIG. 5 is a partial bottom perspective view depicting selected components of the vehicle bed floor of FIG. 4.

FIGS. 4 and 5 depict an exemplary vehicle bed element comprising a vehicle bed floor 26. The closure member 30 can be opened to reveal an access opening leading to both a first chamber 74 and a second chamber 78. As shown, the first chamber 74 can be substantially defined by a first shell 76 and the second chamber 78 can be at least partially defined by a second shell 80.

The vehicle bed floor 26 may be mounted to a support structure 71 of a vehicle 20, as best shown in FIG. 3 for example. The support structure 71 may comprise one or more first fastening locations 70 and/or one or more second fastening locations 110 to assist in mounting the vehicle bed floor 26 to the support structure 71. Second fastening locations 110 may be used at locations with limited surface area available for mounting. A combination of fastening locations 70 and 110 may be particularly useful in applications where there are various support structural specifications that include different surface areas available as fastening locations. Although not particularly identified and/or depicted, the support structure 71 may further comprise one or more similar fastening locations to facilitate attachment with the tailgate element 40, headboard element 42, left side element 34 and/or right side element 36. The support structure 71, including the fastening locations 70 and 110 can comprise nonmetallic or metallic materials such as steel, aluminum, or the like. In still further embodiments, the support structure 71 might be a unibody structure or integral with a vehicle frame.

Figure 6:
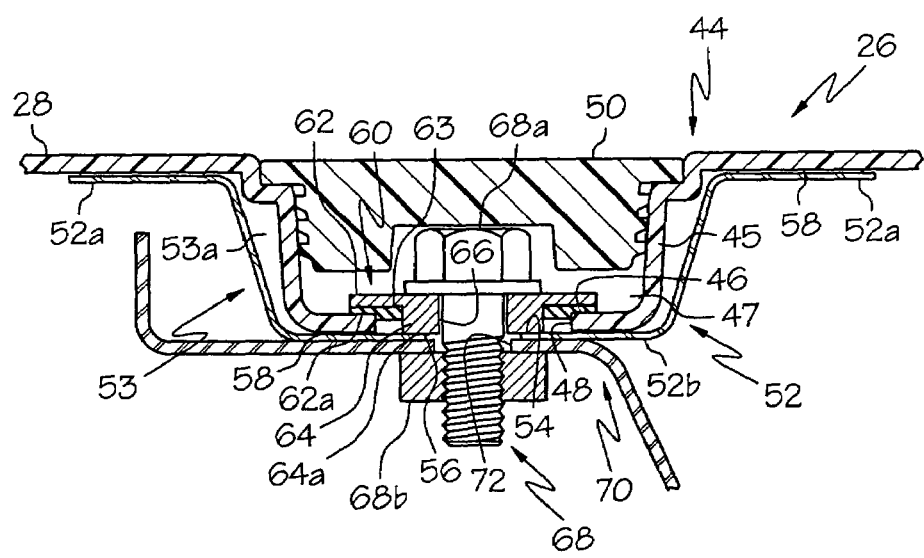
FIG. 6 is a partial cross-sectional view, along line 6—6 in FIG. 2, of a fastening section in accordance with one exemplary embodiment of the present invention.
Figure 7:
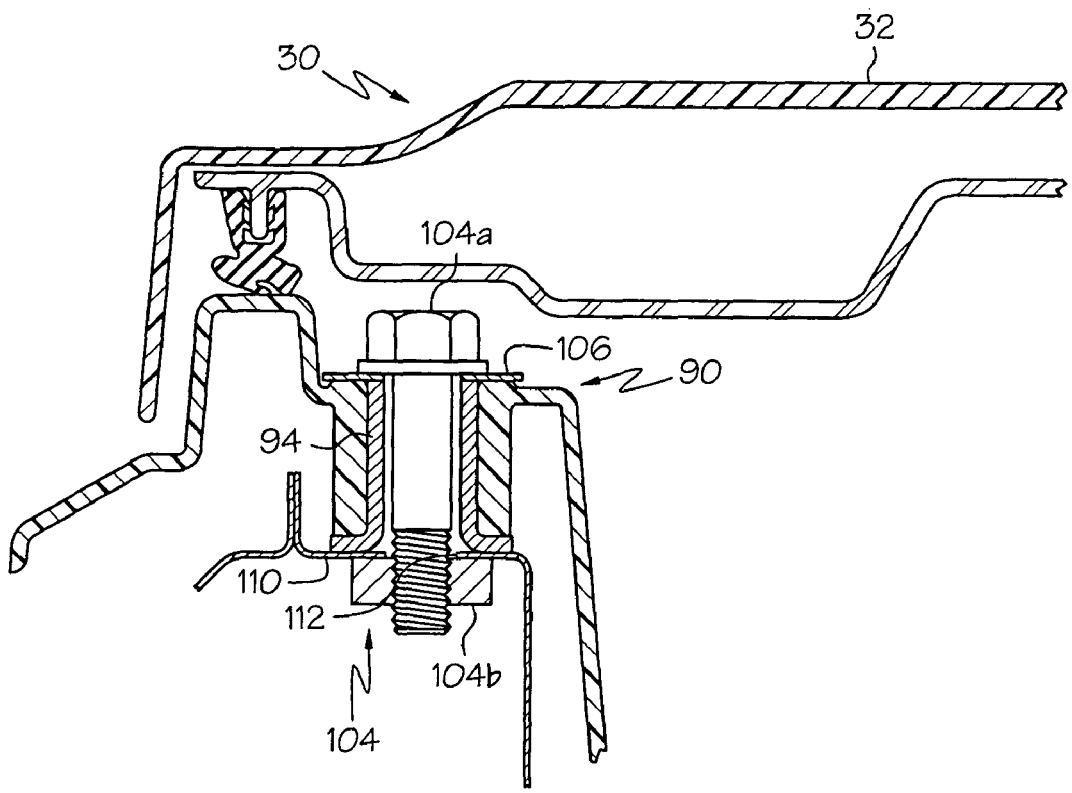
FIG. 7 is a partial cross-sectional view, along line 7—7 in FIG. 2, of a fastening section in accordance with another exemplary embodiment of the present invention.

In applications where there is a larger surface area available for mounting, the fastening system may include a securement structure 44 for mounting the vehicle floor bed 26 at the first fastening location 70, as best shown in FIGS. 2, 4 and 6 for example. The securement structure 44 functions to provide a mounting location for the vehicle bed floor 26. As shown, the securement structure 44 is integral and formed as part of the vehicle bed floor 26. Although not shown, the securement structure may be separate from the floor for mounting thereto.

The securement structure 44 and elements related thereto, function to improve the fastening characteristics between the vehicle floor bed 26 and the first fastening location 70 of the support structure 71. As shown in FIG. 6, a mounting structure 52 can be fastened with respect to the securement structure 44 and functions to facilitate secure attachment between the vehicle floor bed 26 and the first fastening location 70. For example, as best shown in FIGS. 5 and 6, one or more mounting structures 52 can be fastened to the underside of the bed floor 26 with an adhesive layer 58. In addition or alternatively, the mounting structures 52 might be molded to the bed floor 26 and/or fastened to the underside of the bed floor with welds, bolts, or other fastening techniques, for example. The mounting structure 52 can be fabricated from a material that has a lower creep rate than the creep rate of the securement structure 44. Creep rate is the tendency of a material to flow and lose resilience under elevated temperature and/or pressure conditions. A material with a sufficiently low creep rate at a fastening location may be desirable since the low creep rate property of the material will prevent loosening of the fastener over time that would otherwise occur if the material began to creep under compression by the fastener. While a wide variety of materials may be used, low creep rate material for exemplary mounting structures can comprise non-metallic or metallic materials such as steel, aluminum or the like.

In exemplary embodiments, the mounting structures 52 can take the form of reinforcement members to increase the structural integrity of the element. For example, as shown in FIGS. 5 and 6, the mounting structures 52 comprise cross braces fastened with respect to a surface of the securement structure 44. Each cross brace may be arranged such that it extends across a lower surface of the vehicle bed floor 26. Forming the reinforcement members as a cross braces can function to increase the rigidity of a support panel, thereby deterring panel flexing when the panel is supporting a load.

In particular examples, the mounting structures are configured to provide a mounting function and a reinforcement function. For example, as shown in FIGS. 5 and 6, the mounting structure 52 can take the form of a cross brace that acts to reinforce the panel while also providing a mounting structure. FIG. 6 illustrates one exemplary embodiment of a fastening system in accordance with the present invention. As shown, the mounting structure 52 may be fastened with respect to the securement structure 44, for example, by an adhesive layer 58. In the illustrated embodiment, lateral tabs 52a are mounted to a surface of the securement structure and a surface of a countersunk portion 45 of the securement structure 44 is also attached to a mounting portion 52b of the mounting structure 52. Providing the securement structure 44 with a countersunk portion 45 is not necessary to carry out the concepts of the present invention. A countersunk portion 45, however, may be desirable to hide the surfaces of the fastener from the support surface of the vehicle bed floor 26. Moreover, the countersunk portion 45 may be particularly desirable when connecting to a cross brace portion. As shown in FIG. 6, the mounting portion 52 comprises a cross brace that has a general C-shaped cross section 53 with lateral tabs 52a extending from the cross sectional portion 53. Providing the cross beam with a general C-shaped cross section increases the bending interia of the cross beam, thereby maximizing its effectiveness as a reinforcement structure for the vehicle bed floor 26. The countersunk portion 45 therefore effectively cooperates with the cross beam by extending down into a cavity 53a defined by the general C-shaped cross section 53 for connection to the mounting portion 52b of the mounting structure 52.

While the mounting structure 52 is shown attached to the securement structure at two locations (i.e., the lateral tabs 52a and the mounting portion 52b), it is understood that the mounting location can be located only at the lateral tabs 52a or only at the mounting portion 52b. Hence, although not shown, there may be adhesive located at only one or more of the lateral tabs or only the mounting portion. Still further, the mounting structure 52 may be fastened with respect to the securement structure without actually being fastened to the securement structure 44. That is, the mounting structure 52 may be fastened to the vehicle bed floor 26 at a location other than at or adjacent to the securement structure 44.

In exemplary embodiments, a bearing surface 54 of the mounting structure 52 and a bearing surface 46 of the securement structure 44 face generally in a first direction (e.g., generally toward a cavity 47 defined by the countersunk portion 45). As shown, the bearing surface 54 surrounds a mounting structure aperture 56 while the bearing surface 46 surrounds a structure aperture 48. As shown, the securement structure aperture 48 is larger than the mounting structure aperture 56 such that the bearing surface 54 is exposed to the cavity 47. In one particular embodiment, as shown, the bearing surface 54 is exposed to the cavity 47 by providing the mounting structure aperture 56 with a diameter (e.g., circular diameter) that is smaller than a diameter (e.g., circular diameter) of the securement structure aperture 48. In the illustrated exemplary embodiment, the mounting structure aperture 56 is concentrically aligned with the securement structure aperture 48.

The fastening system further includes a bearing member 60 with a first portion 62 and a second portion 64. As further shown in FIG. 6, the first portion 62 includes a surface 62a adapted to engage the bearing surface 46 of the securement structure 44. The second portion 64 also includes a surface 64a adapted to engage the bearing surface 54 of the mounting structure 52. The surfaces 62a, 64a can comprise planar surfaces and might each extend along distinct imaginary planes that are offset and parallel to one another. As further shown, the first portion 62 may optionally include a resilient, e.g., rubber, washer 63 to enhance the fastening function. As shown, the surface 62a of the first portion 62 is offset from the surface 64a of the second portion 64 so that the surfaces 62a, 64a may simultaneously engage the bearing surfaces 46, 54, respectively, when the bearing member 60 is compressed during the fastening process. In particular, the second portion 64 may include a diameter that is smaller than the diameter of the securement structure aperture 48 and larger than the diameter of the mounting structure aperture 56. The bearing member 60 may therefore be biased, for example by a fastener 68, such that the bearing surfaces 46, 54 may both simultaneously receive compressive force from the respective first and second surfaces 62a, 64a of the bearing member 60. While the bearing member 60 is disclosed in the figures as including a dual shouldered washer member, in exemplary embodiments, the bearing member 60 can further comprise at least part of a fastener 68. For example, the bearing member 60 can be included as part of a bolt 68a wherein the dual shoulders are located at the head portion of the bolt 68a.

Each of the embodiments illustrated and described throughout the application include fasteners that are exemplified as a bolt and nut arrangement. It is understood that fasteners described herein may alternatively comprise a wide variety of fastener types known in the industry that are capable of performing a tightening function. For example, the fasteners may comprise a bolt that can be mounted in a threaded aperture integrally formed with the support structure 71. The fastener may further comprise non-threaded fasteners, snap fasteners, or other fasteners that can perform a tightening function.

As shown in FIG. 6, an exemplary fastening connection between the vehicle bed floor 26 and the first fastening location 70 can be provided by first positioning the mounting structure aperture 56 and the securement structure aperture 48 such that they are substantially aligned with an aperture 72 defined at the first fastening location 70. Next, the bearing member 60 is placed with respect to the securement structure 44 such that a surface 62a of the first portion 62 rests against or is positioned adjacent to the bearing surface 46 of the securement structure 44 and the surface 64a of the second portion 64 rests against or is positioned adjacent the bearing surface 54 of the mounting structure 52. A bolt 68a is then inserted through an aperture 66 defined in the bearing member 60, the securement structure aperture 48, the mounting structure aperture 56 and the first fastening location aperture 72. A nut 68*b* is then engaged with the bolt 68*a* and torqued down until the bearing member 60 is sufficiently biased against the securement structure 44 and the mounting structure 52. An optional cap 50 may then be inserted in the cavity 47 to cover the mounting structures.

The fastening system described above is useful in that a dual engagement connection is provided that independently provides a fastening function and together provides a useful enhanced fastening function to ensure proper connection throughout the life of the fastening arrangement. For example, the second portion 64 is biased against the mounting structure 52 that is adhered to the vehicle bed floor 26 for indirect and independent fastening of the vehicle bed floor 26 to the first fastening location 70 while the first portion 62 is also biased against the securement structure 44 to provide a further direct and independent fastening of the vehicle bed floor 26 to the first fastening location 70. The dual fastening function also accommodates for weaknesses that would occur if attempting to use only one of the fastening functions described above. For example, providing only the first portion 62 of the bearing member 60 would require increased torquing of the fastener 68 to maintain the desired torque level with the fastener 68. Such increased torquing may likely lead to creep in the securement structure 44 to the point where the fastener 68 may lose the desired torque level, thereby leading to loosening of the fastener 68 that will eventually cause failure of the fastening function. On the other hand, only providing the second portion 64 of the bearing member 60 would increase the likelihood of failure due to a probable disconnection between the mounting structure 52 and the vehicle bed floor 26. As the fastener 68 would be indirectly fastened to the securement structure 44, vibrational energy from the vehicle bed floor 26 would necessarily transmit through the potentially fragile adhesive layer 58. If the adhesive layer 58 fails, then the securement structure 44 and the rest of the vehicle bed floor 26 would lose its connection to the first fastening location 70. Providing a dual fastening system minimizes these potential failures to enhance the fastening characteristics and reliability of the fastening conneciton. The first portion 62 provides a direct fastening engagement with the securement structure 44. Moreover, creep problems are avoided as a portion of the force from the torqued fastener 68 is absorbed by the mounting structure 52. Still further, even if creep does occur, the first portion 62 will still rest on top of the bearing surface 46 to discourage relative movement between securement structure 44 and the mounting structure 52, for example due to vibration, that might accelerate structural failure of the adhesive layer 58 connecting the mounting structure 52 to the securement structure 44.

Turning now to FIGS. 7–18E, further exemplary embodiments of fastening systems are disclosed that are particularly useful at locations where there is limited surface area available for mounting. For example, with respect to FIG. 3, such fastening systems may be used in cooperation with second fastening locations 110 that contain a limited amount of area available for mounting.

With respect to FIGS. 7–10, a fastening system includes a vehicle bed floor 26 with a securement structure 90 for mounting to a second fastening location 110 with a fastener 104, such as a bolt 104*a* and nut 104*b* combination. The securement structure 90 includes at least one extension element 92*a* adapted to be compressed by a fastener 104. The securement structure 90 further includes a compression reinforcement device 94 mounted with respect to the securement structure 90. In various exemplary embodiments, the compression reinforcement device 94 may be fixedly mounted to the securement structure 90 or slidably mounted to the securement structure 90. Exemplary embodiments illustrated in FIGS. 7–13 might have compression reinforcement devices that are fixedly mounted with respect to the securement structure while the exemplary embodiments illustrated in FIGS. 14–16 might have compression reinforcement devices that are slidably mounted with respect to the securement structure. In one example, the compression reinforcement device 94 may be fixedly mounted to the securement structure 90 by being press fit within a cavity or aperture of the securement structure 90. The compression reinforcement device 94 may also be fixedly mounted to the securement structure 90 with adhesive, welding, mechanical connection or the like.

The compression reinforcement device 94 is fabricated from a material having a lower creep rate than the securement structure 90. As stated above, a material with a sufficiently low creep rate at a fastening location may be desirable since the low creep rate property of the material will prevent loosening of the fastener over time that would otherwise occur if the material began to creep under compression by the fastener. While a wide variety of materials may be used, low creep rate material for exemplary mounting structures can comprise non-metallic or metallic materials such as steel, aluminum or the like. Moreover, the compression reinforcement device 94 may comprise a wide variety of shapes. In one particular example, the compression reinforcement device 94 comprises an annular collar as best shown in FIGS. 7–16.

Figure 8:
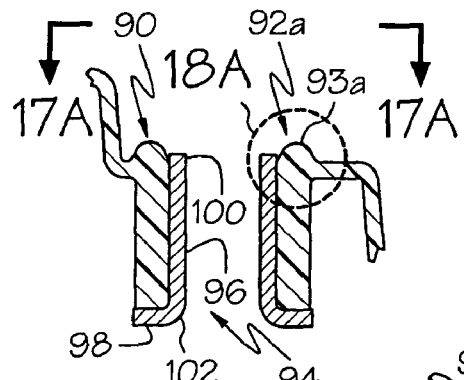
FIG. 8 is illustrates the exemplary embodiment of the fastening section of FIG. 7 prior to its fastening at a fastening location.
Figure 18A:
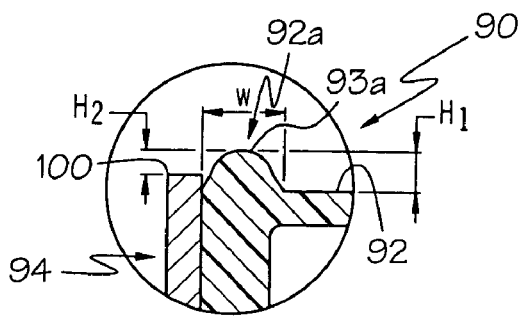
FIG. 18A illustrates an enlarged view depicting a portion of the fastening section of FIG. 8.

The compression reinforcement device 94 can include a first end 100 and an opposed second end 102. In one exemplary embodiment, at least a portion of the securement structure 90 extends above the first end 100 of the compression reinforcement device 94. For example, as shown in FIG. 8, the portion of the securement structure 90 that extends above the first end 100 comprises a distal end 93*a* of the extension element 92*a*. The distal end 93*a* of the extension element 92*a* extends above the first end 100 prior to its use in performing a fastening function. As best illustrated in FIG. 18A, prior to being compressed during a fastening function, the distal end 93*a* can extend a distance $H_1$ above a base portion 92 of the securement structure 90 and a distance $H_2$ above the first end 100 of the compression reinforcement device 94. Although $H_1$ is disclosed as having a greater height than $H_2$ in the figures, it is contemplated that $H_1$ might be substantially equal to $H_2$ in further exemplary embodiments.

Figure 18B:
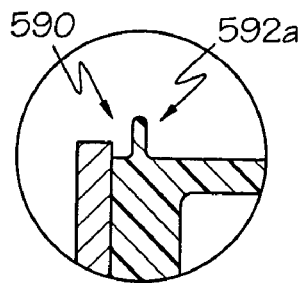
FIG. 18B illustrates an alternative exemplary embodiment of an extension element in accordance with the present invention.
Figure 18C:
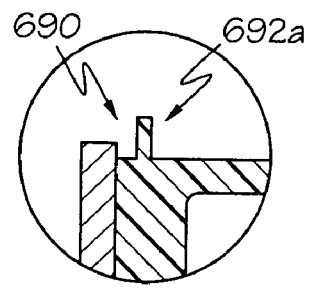
FIG. 18C illustrates another exemplary embodiment of an extension element in accordance with the present invention.
Figure 18D:
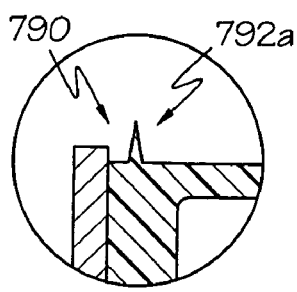
FIG. 18D illustrates still another exemplary embodiment of an extension element in accordance with the present invention.
Figure 18E:
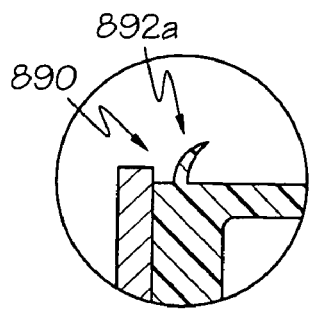
FIG. 18E illustrates yet another exemplary embodiment of an extension element in accordance with the present invention.

Extension elements in accordance with exemplary embodiments of the present invention may comprise various structural properties and be arranged in various configurations. As shown in FIG. 18A, the extension element may have a width W that may be selected depending on the particular application. The particular width and height of the extension element can be selected to permit the extension element to receive adequate pressure from the fastener, and can be further selected to reduce creep complications associated with fastening materials having sufficiently high creep rates. FIGS. 18B–18E depict exemplary embodiments of extension element profiles that may be used with the concepts of the present invention. In addition or alternatively, it is understood that, although not shown, a wide variety of additional extension element profiles may be incorporated with the concepts of the present invention. FIG. 18B illustrates a securement structure 590 including an extension element 592*a* with a relatively narrow width profile when compared to the extension element 92*a* illustrated in FIG. 18A. FIG. 18C illustrates another securement structure 690 including an extension element 692a having a profile with blunted end portion. Still further, FIG. 18D discloses a securement structure 790 with an extension element 792a having a pointed, triangulated profile. FIG. 18E depicts yet another a securement structure 890 with an extension element 892a having a crescent-shaped profile.

As shown throughout the exemplary embodiments, the one or more extension elements are illustrated as being disposed adjacent either the first end or the second end of the compression reinforcement device. It is also understood that one or more extension elements can be disposed adjacent both the first and second end of the compression reinforcement device.

Figure 17A:
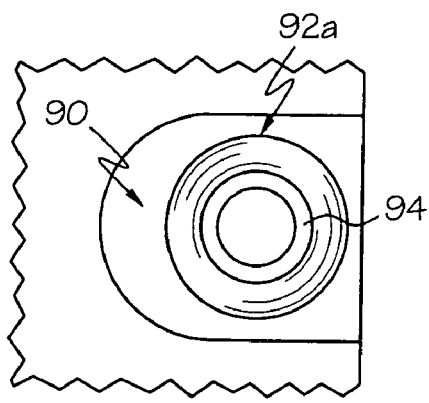
FIG. 17A illustrates a top view taken along line 17A—17A of the fastening section of FIG. 8.
Figure 17B:
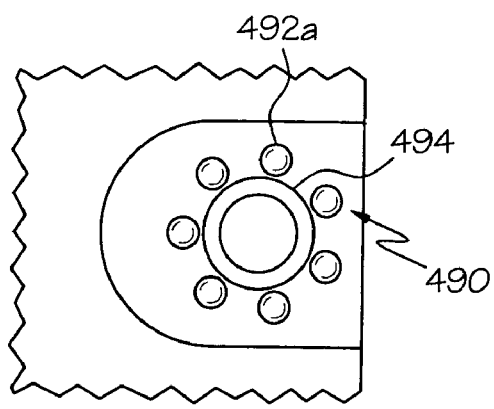
FIG. 17B illustrates a top view of an alternative embodiment taken along line 17A—17A of FIG. 8.

Each of the various extension elements in accordance with the present invention may be disposed in various configurations about the compression reinforcement device. For example, as shown in FIG. 17A, each of the extension elements in accordance with the exemplary embodiments illustrated in FIGS. 18A–18E may comprise an extension element in the form of an annular extension element disposed concentrically with respect to the compression reinforcement device. Although not shown, the extension element may comprise a plurality of extension elements in the form of offset annular extension elements disposed concentrically around the compression reinforcement device. Still further, as shown in the securement structure 490 of FIG. 17B, each of the extension elements in accordance with the exemplary embodiments illustrated in FIGS. 18A–18E may comprise a plurality of extension elements 492a disposed radially about the compression reinforcement device 494. While FIG. 17B discloses the extension elements 492a being equally radially spaced about the compression reinforcement device 492 and disposed about an imaginary circle that is concentric with the compression reinforcement device 492, alternative embodiments may comprise non equal radial spacing and/or non concentric disposition of the extension elements.

Turning back to the exemplary embodiments illustrated in FIGS. 7–10, the compression reinforcement device 94 can include a foot 98 to distribute bearing stress about an aperture 112 at the second fastening location 110. The foot is also effective to trap portions of the securement structure 90 as it is compressed by the fastener 104. As previously mentioned, the compression reinforcement device 94 can take the form of an annular collar. In further exemplary embodiments, the annular collar includes a body portion 96 (e.g., as shown in FIG. 8) that is concentric with an aperture defined by the securement structure. As shown in FIG. 8, for example, the foot 98 can extend radially away from the body portion. More particularly, the foot 98 is shown to extend radially away from the body portion at the second end 102 of the annular collar.

Figure 9:
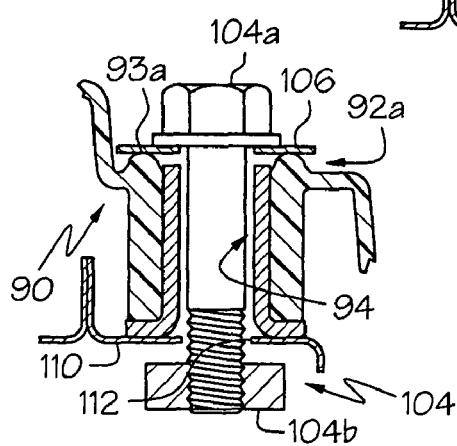
FIG. 9 illustrates the exemplary embodiment of the fastening section of FIG. 7 just prior to compression of an extension element with a fastener.
Figure 10:
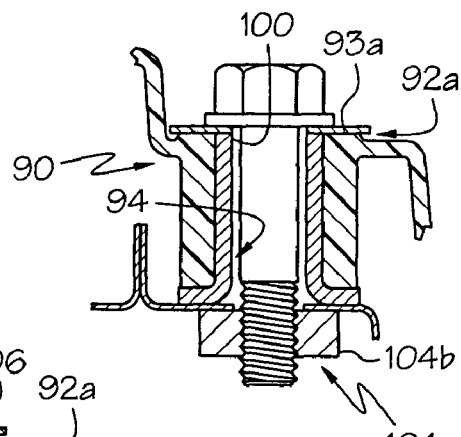
FIG. 10 illustrates the exemplary embodiment of the fastening section of FIG. 7 after compression of the extension element with the fastener.

As shown in FIG. 9, when assembling the securement structure 90 and compression reinforcement device 94 to the second fastening location 110, the securement structure 90 and compression reinforcement device 94 are first placed adjacent the second fastening location 110. Next, a bearing member 106, if provided separately from the fastener 104, is positioned such that it abuts the distal end 93a of the extension element 92a. Next, a fastener 104, such as a bolt 104a, is inserted through the aperture of the bearing member 106, the aperture of the compression reinforcement device 94 and an aperture 112 defined by the second fastening location 110. A nut 104b is then attached to the threaded end of the bolt 104a. As shown in FIG. 10, the nut 104b is then tightened such that the extension element 92a is compressed by the fastener 104 such that the distal end 93a of the extension element 92a is positioned substantially level with the first end 100 of the compression reinforcement device 94 and wherein the compression reinforcement device 94 and the securement structure 90 both receive compressive force from the fastener 104.

With the compressive load distributed between the compression reinforcement device 94 and the securement structure 90, the fastening arrangement can be optimized. Compression of the securement structure 90 discourages relative movement between the compressive reinforcement device 94 and the securement structure 90, thereby preventing unwanted vibrational acoustic noise and potential failure of the fixed mounting of the compression reinforcement device 94 with respect to the securement structure 90. Still further, distribution of force to the compression reinforcement device 94 can facilitate the maintenance of a desired compression force by the fastener 104 due to the sufficiently low creep rate of the compression reinforcement device material.

As shown in the exemplary embodiments, a bearing member 106, such as a washer, can be provided to facilitate compression of the extension element 92a by the fastener 104. While the exemplary embodiments illustrate the fastener 104 compressing the extension element indirectly through the bearing member 106, each of the exemplary embodiments of the present invention (e.g., see FIGS. 7–16) may be used in applications where the fastener 104 includes the bearing member 106. For example, in each of the embodiments discussed herein, the bearing member 106 can be formed integrally with the end of the bolt such that the fastener directly compresses the extension element.

Another exemplary embodiment of the present invention is illustrated in FIGS. 11–13 wherein a compression reinforcement device 294 is mounted with respect to a securement structure 290. The embodiment of FIGS. 11–13 is similar to the embodiment of FIGS. 7–10 except that the compression reinforcement device 294 does not include a foot extending radially from the body portion 296. As shown, the compression reinforcement device 294 comprises an annular collar with a substantially constant outer diameter between its first end 200 and the second end 202. Providing the compression reinforcement device 294 without a foot may be desirable to reduce manufacturing costs and may be particularly useful in applications where the fastener is not exerting a high compression force and/or where the second fastening location 110 has a substantial structural integrity that would avoid punching failure due to excessive bearing stresses.

As shown in FIG. 12, when assembling the securement structure 290 and the compression reinforcement device 294 at the second fastening location 110, the securement structure 290 and compression reinforcement device 294 are first placed adjacent the second fastening location 110. Next, a bearing member 106, if provided separately from the fastener 104, is positioned such that it abuts the distal end 293a of the extension element 292a. Next a fastener 104, such as a bolt 104a, is inserted through the aperture of the bearing member 106, the aperture of the compression reinforcement device 294 and the aperture 112 defined at the second fastening location 110. A nut 104b is then attached to the threaded end of the bolt 104a. As shown in FIG. 13, the nut 104b is then tightened such that the extension element 292a is compressed by the fastener 104 such that the distal end 293a of the extension element 292a is positioned substantially level with the first end 200 of the compression reinforcement device 294 and wherein the compression reinforcement device 294 and the securement structure 290 both receive compressive force from the fastener 104.

FIGS. 14–16 illustrate still another embodiment of the present invention. This embodiment is similar to the embodiment illustrated in FIGS. 7–10 except that the securement structure 390 is slidably mounted with respect to the compression reinforcement device 394. Moreover, an extension element 392b is positioned such that a distal end 392c of the extension element 392b is adapted to abut a surface of a foot 398 while a portion 392a of the securement structure 390 extends above the first end 300 of the compression reinforcement device 394.

As shown in FIG. 15, when assembling the securement structure 390 and the compression reinforcement device 394 at the second fastening location 110, the securement structure 390 and compression reinforcement device 394 are first placed adjacent the second fastening location 110. Next, a bearing member 106, if provided separately from the fastener 104, is positioned such that it abuts the portion 392a of the securement structure 390 that extends above the first end 300 of the compression reinforcement device 394. Next a fastener 104, such as a bolt 104a, is inserted through the aperture of the bearing member 106, the compression reinforcement device 394 and the aperture 112 defined at the second fastening location 110. A nut 104b is then attached to the threaded end of the bolt 104a. As shown in FIG. 16, the nut 104b is then tightened such that the extension element 392b is compressed by the fastener 104 such that the portion 392a of the securement structure 390 is positioned substantially level with the first end 300 of the compression reinforcement device 394 and the distal end 392c of the extension element 392b is compressed against the surface of the foot 398. As shown in FIG. 16, once the fastener 104 is tightened, the compression reinforcement device 394 and the securement structure 390 both receive compressive force from the fastener 104.

While the concepts of the present invention have been described with respect to an element for a vehicle comprising a vehicle bed floor 26, the inventive concepts of the present invention may be applied to additional elements within a vehicle. Although not limited to panel elements, exemplary further elements for a vehicle can comprise sound absorption panels, structural panels, support panels, protective panels for covering mechanical and/or electrical components, aesthetic panels, or the like. It is also contemplated that the vehicle bed elements may comprise a headboard element 42, tailgate element 40, side element 34, 36 or the like. In even further applications, fastening systems in accordance with the concepts of the present invention may be applied to various mounting systems and arrangements and are not limited to vehicular applications. For example, fastening systems in accordance with the present invention may be incorporated in the building construction industry, manufacturing industry (e.g., machine manufacture), transportation industry, material handling industry or other applications.

Throughout the application, the fastening system has been discussed in association with an object that is an integral part of an element for a vehicle. However, it is understood that the object can simply comprise a mounting device capable of use in a wide variety of alternative applications. For example, an object in the form of a mounting device may comprise a bracket or intermediate bracket that attaches to a further object (e.g., a vehicle element) for mounting the further object to a support structure. For example, after attachment of such a mounting device to the vehicle element, the vehicle element may be mounted with respect to the support structure as discussed more fully above. Providing an object as a mounting device may simplify the production process by allowing the compression reinforcement device to be inserted with respect to a smaller piece (e.g., as part of a smaller mounting device rather than a vehicle element) and may also allow one or more standard mounting devices to be formed including the securement structure where the mounting device can be attached to a wide variety of elements at a later time. For example, when providing the object as a mounting device, an inventory of mounting devices may be accumulated for later use. During assembly, these mounting devices may then be selected for attachment to a desired vehicle element (e.g., tailgate element, headboard element, side element, vehicle floor bed, etc.). Once the mounting device is attached to the vehicle element, the vehicle element may then be installed at the desired location.

Providing an object as a mounting device for later attachment to a further object (e.g., vehicle element) may also be beneficial to allow for customization of the fastening arrangements for the further object. For example, a first mounting device may be provided with many of the features of FIG. 6 discussed above for mounting at locations that have adequate surface areas available for mounting while a second mounting device may be provided with a combination of features described with respect to FIGS. 7–18E above for mounting at locations with limited surface areas available for mounting. One or more first and/or second mounting devices may therefore be selected for mounting the vehicle element. For example, a plurality of first and second mounting devices may be selected and fastened at appropriate locations to a vehicle element in a pattern that will permit the vehicle element to be mounted to a unique support structure arrangement having fastening locations with different available surface areas for mounting.

The foregoing description of exemplary embodiments and examples of the invention has been presented for purposes of illustration and description. It is not intended to be exhaustive or limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

What is claimed is:

1. A fastening system for fastening an object on an article comprising:
   a) an object including a securement structure operable for mounting the object on an underlying article, the securement structure including a bearing surface, wherein the securement structure is formed from a material having a first creep rate;
   b) a mounting structure operable to be fastened between the securement structure and the underlying article, the mounting structure including a bearing surface, wherein the mounting structure is formed from a material having a second creep rate, wherein the second creep rate is less than the first creep rate; and
   c) a bearing member including a first portion for bearing against the bearing surface of the securement structure, a second portion for bearing against the bearing surface of the mounting structure, and a third portion to be biased by a fastener such that the bearing surfaces of the securement structure and the mounting structure receive compressive force from the respective first and second portions of the bearing member, and the first and second portions provide compressive force to the underlying article.

2. The fastening system of claim 1, wherein the object is included as an element for a vehicle.

3. The fastening system of claim 2, wherein the element comprises a vehicle bed element.

4. The fastening system of claim 2, wherein the object is an integral part of the element.

5. The fastening system of claim 1, wherein the mounting structure comprises a cross brace fastened with respect to a surface of the securement structure.

6. The fastening system of claim 1, wherein a surface of the second portion of the bearing member is offset from a surface of the first portion of the bearing member.

7. The fastening system of claim 6, wherein the surface of the first portion of the bearing member comprises a first planar surface and wherein the surface of the second portion of the bearing member comprises a second planar surface.

8. The fastening system of claim 1, wherein the first portion of the bearing member includes a resilient washer.

9. The fastening system of claim 1, wherein the securement structure is provided with an aperture having a diameter and the mounting structure is provided with an aperture that has a smaller diameter than the diameter of the securement structure aperture, the bearing surface of the securement structure circumscribes the securement structure aperture and the bearing surface of the mounting structure circumscribes the mounting structure aperture, the first portion of the bearing member has a diameter that is larger than the diameter of the securement structure aperture and the second portion of the bearing member has a diameter that is smaller than the diameter of the securement structure aperture and larger than the diameter of the mounting structure aperture.

10. The fastening system of claim 9, wherein the mounting structure aperture is concentrically aligned with the securement structure aperture.

11. A fastening system for fastening an object on an article comprising:
   a) an object including a securement structure operable for mounting the object on an article, the securement structure including a bearing surface, wherein the securement structure is formed from a material having a first creep rate;
   b) a mounting structure operable to be fastened with respect to the securement structure, the mounting structure including a bearing surface, wherein the mounting structure is formed from a material having a second creep rate, wherein the second creep rate is less than the first creep rate, wherein the mounting structure includes a cross sectional portion with a general C-shaped cross section, and the securement structure includes a countersunk portion that extends down into a cavity defined by the cross sectional portions and
   c) a bearing member including a first portion for bearing against the bearing surface of the securement structure and a second portion for bearing against the bearing surface of the mounting structure, wherein the bearing member is operable to be biased by a fastener such that the bearing surfaces of the securement structure and the mounting structure receive compressive force from the respective first and second portions of the bearing member.

12. A vehicle bed adapted for mounting on a fastening location of a vehicle, the vehicle bed comprising:
   a) a vehicle bed element including a securement structure provided with an aperture having a diameter and including a bearing surface circumscribing the aperture, the securement structure operable for mounting the vehicle bed element on a vehicle, wherein the securement structure is formed from a material having a first creep rate;
   b) a mounting structure operable to be fastened between the securement structure and the vehicle, the mounting structure provided with an aperture that has a smaller diameter than the diameter of the securement structure aperture, the mounting structure including a bearing surface circumscribing the mounting structure aperture, wherein the mounting structure is formed from a material having a second creep rate, and the second creep rate is less than the first creep rate; and
   c) a bearing member including a first portion with a first surface for bearing against the bearing surface of the securement structure, the first portion including a diameter that is larger than the diameter of the securement structure aperture, the bearing member further including a second portion with a second surface that is offset from the first surface for bearing against the bearing surface of the mounting structure, the second portion including a diameter that is smaller than the diameter of the securement structure aperture and larger than the diameter of the mounting structure aperture, and the bearing member further including a third portion with a third surface to be biased by a fastener such that the bearing surfaces of the securement structure and the mounting structure receive compressive force from the respective first and second surfaces of the bearing member, and the first and second portions provide compressive force to the vehicle.

13. The vehicle bed of claim 12, wherein the mounting structure comprises a cross brace fastened with respect to a surface of the securement structure.

14. The vehicle bed of claim 12, wherein the first surface of the bearing member comprises a first planar surface and wherein the second surface of the bearing member comprises a second planar surface.

15. The vehicle bed of claim 12, wherein the first portion of the bearing member includes a resilient washer.

16. The vehicle bed of claim 12, wherein the mounting structure includes a cross sectional portion with a general C-shaped cross section, and the securement structure includes a countersunk portion that extends down into a cavity defined by the cross sectional portion.

17. The fastening system of claim 1, wherein the bearing member is biased with a fastener and the object is fastened with respect to the article.

18. The vehicle bed of claim 12, wherein the bearing member is biased with a fastener and the vehicle bed element is fastened with respect to the vehicle.

* * * * *

UNITED STATES PATENT AND TRADEMARK OFFICE
CERTIFICATE OF CORRECTION

PATENT NO. : 7,086,688 B2 Page 1 of 1
APPLICATION NO. : 10/663270
DATED : August 8, 2006
INVENTOR(S) : David Michael Edwards It is certified that error appears in the above-identified patent and that said Letters Patent is hereby corrected as shown below:

Column 13, line 55, change "portions and" to -- portion; and --.

Signed and Sealed this

Twenty-first Day of November, 2006

JON W. DUDAS
*Director of the United States Patent and Trademark Office*